(12) United States Patent
Bachofer

(10) Patent No.: US 10,995,874 B2
(45) Date of Patent: May 4, 2021

(54) VALVE DEVICE

(71) Applicant: Mack & Schneider GmbH, Filderstadt (DE)

(72) Inventor: Steffen Bachofer, Filderstadt (DE)

(73) Assignee: MACK & SCHNEIDER GMBH, Filderstadt (DE)

( * ) Notice: Subject to any disclaimer, the term of this patent is extended or adjusted under 35 U.S.C. 154(b) by 10 days.

(21) Appl. No.: 16/340,168

(22) PCT Filed: Oct. 10, 2017

(86) PCT No.: PCT/EP2017/075748
§ 371 (c)(1),
(2) Date: Apr. 8, 2019

(87) PCT Pub. No.: WO2018/069280
PCT Pub. Date: Apr. 19, 2018

(65) Prior Publication Data
US 2019/0309870 A1   Oct. 10, 2019

(30) Foreign Application Priority Data

Oct. 10, 2016 (DE) ..................... 10 2016 219 630.8

(51) Int. Cl.
*F16K 31/00* (2006.01)
*F16K 11/044* (2006.01)
*F16K 27/02* (2006.01)

(52) U.S. Cl.
CPC .......... *F16K 31/002* (2013.01); *F16K 11/044* (2013.01); *F16K 27/0263* (2013.01)

(58) Field of Classification Search
CPC ... G05D 7/012; F16K 27/0263; F16K 11/044; F16K 31/002
See application file for complete search history.

(56) References Cited

U.S. PATENT DOCUMENTS

| | | | |
|---|---|---|---|
| 6,902,391 B2 | 6/2005 | Bauer et al. | |
| 2004/0069308 A1* | 4/2004 | Bayron | A61M 16/20 |
| | | | 128/207.16 |

(Continued)

FOREIGN PATENT DOCUMENTS

| DE | 10 2013 223 907 A1 | 6/2015 |
|---|---|---|
| DE | 10 2014 221 180 A1 | 4/2016 |

(Continued)

OTHER PUBLICATIONS

MITCalc, www.mitcalc.com (Year: 2014).*

(Continued)

*Primary Examiner* — Marc E Norman
*Assistant Examiner* — Schyler S Sanks
(74) *Attorney, Agent, or Firm* — Pearne & Gordon LLP

(57) ABSTRACT

The application relates to a valve device, in particular for a cooling water system of a motor vehicle, comprising a housing, which has an inflow connection and a first outflow connection and a second outflow connection, and comprising a valve, which is mounted in the housing so as to shift in the axial direction, said valve having a cylindrical main part, at each end of which a valve element is arranged in order to close one of the connections in a first sliding end position of the valve and another one of the connections in a second sliding end position of the valve, and having a first spring element, which biases the valve in the direction of the first sliding end position, and having a thermally activatable actuator element, which is designed to push the valve against the force of the spring element, in the direction of the second sliding end position, upon being activated. A provision is that the first spring element and the actuator element, which is designed as a second spring element, are each axially tensioned between one of the valve elements and a bearing web protruding radially inwards from the housing.

10 Claims, 1 Drawing Sheet

(56) References Cited

U.S. PATENT DOCUMENTS

2004/0232249 A1* 11/2004 Brown .................. F01P 7/16
236/34.5
2017/0241556 A1 8/2017 Bachofer

FOREIGN PATENT DOCUMENTS

| EP | 0 959 282 A2 | 11/1999 | | |
|----|----|----|----|----|
| EP | 1 334 853 A1 | 8/2003 | | |
| EP | 2 113 698 A2 | 11/2009 | | |
| JP | 59-151678 A | 8/1984 | | |
| JP | 59-197682 A | 11/1984 | | |
| JP | 59197682 A | * 11/1984 | .......... | F16K 31/002 |
| JP | 61-191580 U | 11/1986 | | |
| JP | 63-318382 A | 12/1988 | | |
| JP | 2010-025363 A | 2/2010 | | |

OTHER PUBLICATIONS

International Search Report from Corresponding International Application No. PCT/EP2017/075748 dated Feb. 15, 2018.
Written Opinion from Corresponding International Application No. PCT/EP2017/075748 dated Feb. 15, 2018.
International Preliminary Report on Patentability from Corresponding International Application No. PCT/EP2017/075748 dated Apr. 16, 2019.
English translation of Written Opinion from Corresponding International Application No. PCT/EP2017/075748 dated Feb. 15, 2018.
Extended European Search Report dated Dec. 7, 2020 for corresponding European Application No. EP 17 781 122.1.

* cited by examiner

VALVE DEVICE

FIELD OF THE INVENTION

The invention relates to a valve device, in particular for a cooling water system of a motor vehicle, comprising a housing, which has an inflow connection and a first outflow connection and a second outflow connection, comprising a valve, which is mounted in the housing so as to shift, wherein the valve has a cylindrical main part, at each end of which a valve element is arranged in order to close one of the connections in a first sliding end position of the valve and another of the connections in a second sliding end position of the valve, and comprising a first spring element, which biases the valve in the direction of the first sliding end position, as well as comprising a thermally activatable actuator element, which is designed to push the valve against the force of the spring element in the direction of the second sliding end position upon being activated.

BACKGROUND OF THE INVENTION

Valve devices of the aforementioned type are known from the prior art. Thus, patent specification EP 1 334 853 B2, for example, discloses a common valve device. The valve in this case is formed as a single part with the valve bodies arranged thereon, wherein the valve bodies have sealing surfaces, which are arranged, pointing toward each other or facing each other, on the valve, in order to interact with housing valve seats positioned between the valve bodies, when the valve is pushed into the first or the second sliding end position. In this case, a spring element, which biases the valve in the first sliding end position, is assigned to a front side of the valve, and arranged to be axially tensioned or pre-tensioned between the valve and a front side of the housing. Thus, the spring element directly impacts the valve body with a tensioning force, which body is thereby pushed against the valve seat in the housing. The actuator element, which counteracts the spring force upon being activated, is assigned to the other valve body. To this end, the actuator element is connected to a temperature sensor assembly, which has a temperature sensor medium with a temperature-dependent volume, wherein a temperature-dependent volume change in the temperature sensor medium moves the stiffly designed actuator element against the force of the spring element.

The known valve device has the disadvantage that installation and production are complicated and expensive. In particular, the valve, which is designed as a single part, can only be mounted when the housing is separated into a plane parallel to the sliding axis.

BRIEF SUMMARY OF THE INVENTION

Thus, the object of the invention is to obtain a valve device, which ensures an improved assembly, is designed to be compact, and enables low production costs.

The object upon which the invention is based is achieved by means of a valve device having the features of claim 1. It has the advantage that the valve device can be economically produced with a compact installation space due to a clever design of the valve as well as its actuator element. According to the invention, this is achieved in that the first spring element and the actuator element, which is designed as a second spring element, are each axially tensioned between one of the valve elements and a bearing web protruding radially inwards from the housing. Thus, the spring element and actuator element are parallel to the valve, particularly to the main part, and not connected in series for this. Because the spring elements are each tensioned between a valve element and the bearing web, they push the respective spring element away from the bearing web. Because the spring elements lie between the valve elements and the bearing web, they can be arranged compactly in the housing and do not need any additional axial installation space. Because of the fact that the valve may be designed in multiple parts and particularly also is designed in multiple parts, with the main part as one part and the valve elements as the other parts, simple installation of the valve device is likewise ensured.

According to a preferred further development of the invention, a provision is that the spring elements are each formed as helical springs and are arranged coaxially with respect to the main part of the valve. Due to the design as helical springs, the coaxial arrangement is easily possible, wherein the main part itself is also used as a guide for the helical springs in this case such that the helical springs are held on the valve in a captive manner. This ensures long-term safe operation of the valve device in a simple manner.

A further provision is that the bearing web is formed by a bearing ring inserted into the housing. The bearing ring, for example, can be inserted axially into the housing. The separate design of the bearing web from the housing ensures simple installation and production of the valve device. Appropriately, the bearing ring is affixed in the housing, particularly locked with positive locking, such that the mounting of the valve in the housing is defined.

A particular provision is that the bearing ring is formed together with the valve as a preassembled unit. The separate design of the bearing ring, main part, and valve elements ensures simple installation of the preassembled unit. Due to the adding of the bearing ring to the preassembled unit, it is possible for the valve as a whole to be in the housing in a simple manner, including by means of axial insertion into an opening of the housing, such that a separating plane or dividing plane of the housing is formed particularly perpendicular to the sliding direction of the valve. Thus, the housing preferably has a cup-shaped housing element, in the base of which one of the connections is formed, and in the jacket wall of which another of the connections is formed, and on which a housing cover can be placed, which has the remaining connection. The valve then interacts with the connections in the base as well as in the housing cover as a function of its sliding end position. This enables simple installation and removal, for example also for maintenance purposes.

A further preferred provision is that the bearing ring has a bearing opening in order to shift the mounting of the main part. That is, the main part is mounted so as to longitudinally shift in the bearing opening. Due to the bearing opening, the main part is radially reliably guided to the bearing ring and held there.

A further preferred provision is that the bearing opening has at least two, particularly three, or more guide bars for the main part, which protrude radially inwards and are arranged apart from one another in the circumferential direction. The guide bars, which particularly extend axially, ensure that clearances result at least in sections—when viewed in the circumferential direction—due to the main part and bearing ring, in which fluid, for example, can flow through the clearances, which the valve device uses for impacting the fluid. Furthermore, this ensures that contamination in the fluid can flow through the main part bearing in the bearing ring without it causing jamming of the main part in the bearing ring and/or in the bearing opening. This ensures the long-term functionality of the valve device.

A further preferred provision is that the bearing opening is formed in a cylindrical and axially protruding bearing section of the bearing ring. Due to the fact that the bearing section protrudes axially from the bearing ring, an extended bearing opening is provided for the main part such that it can be axially guided reliably, even when the bearing ring itself is narrow—when viewed axially. This makes optimal use of the installation space conditions in the housing.

A further preferred provision is that the bearing section is formed as a guide section for the helical springs. Thus, the helical springs are guided axially in sections on the bearing section itself and particularly held some distance away from the moving mounted main part, such that no tensioning or friction contact can occur between the helical springs and the main part in the vicinity of the bearing ring. This particularly also prevents any of the helical springs from being jammed at the bearing opening with the main part. Preferably, the bearing section has centering chamfers on both sides or on its front sides, said chamfers facilitating the sliding on of the helical springs.

A provision according to an especially preferred embodiment of the invention is that the bearing web is formed by a bearing ring inserted into the housing, the bearing opening is formed in a cylindrical and axially protruding bearing section of the bearing ring, and that the bearing section is formed as a guide section for at least one of the spring elements formed as helical springs and arranged coaxially with respect to the main part. An advantageous preassembled unit is hereby implementable, which ensures the joining of the individual parts, that is, particularly of the main part into the bearing opening of the bearing ring as well as the sliding on and reliable guiding of the helical springs. Due to the guide sections, jamming of the helical springs at the main part, the housing, and/or at the bearing web is reliably prevented. On one hand, the guide sections ensure simplified mounting of the helical springs and, on the other hand, direct contact, for example, between the helical springs and the main part, which is mounted so as to move, is prevented by the guide sections, whereby friction losses are prevented and a reliable operation is ensured in the long term. Because of the fact that the bearing section is formed on the bearing ring, the main part inserted into the bearing opening of the bearing ring, along with the preassembled helical springs and the bearing ring, provides a simple preassembled unit to be mounted in the housing of the valve device.

A further preferred provision is that the bearing ring has at least one axial opening spaced apart from the bearing opening. In addition to the bearing opening, one or more axial openings are formed in the bearing ring. Said axial openings ensure that fluid can flow freely between the valve elements such that the entire interior of the housing between valve elements can be filled with fluid. The bearing ring preferably has multiple radial webs extending radially from the bearing section, which are attached or locked on their end facing the housing. One of the axial openings is formed in the circumferential section between the adjacent webs.

A further preferred provision is that the bearing ring has a continuous support ring on its exterior periphery for mounting in the housing. In this case, particularly the radial webs are then connected to one another on their outer end by the bearing ring and attached to the housing. This ensures a stable and reliable guiding of the valve in the housing, wherein a low weight and easy production are ensured. Alternatively, the bearing ring may also be in the form of a bearing disc, which has multiple axial openings, for example in the form of boreholes or the like, which are arranged separately, particularly uniformly, about the periphery.

A further preferred provision is that the valve bodies each have an elastically deformable sealing element, particularly a sealing ring. The elastically deformable sealing element ensures reliable sealing of the respective closure in the respective sliding end position of the valve. The valve bodies themselves are preferably produced from a rigid material, particularly from plastic, in order to ensure the reliable guiding of the sealing elements.

Advantageously, the valve bodies each have one ring groove, in which the respective sealing element is held, extending over their periphery. This is ensured by means of reliable locking of the sealing element at the valve body using positive locking.

An additional provision according to a preferred further development of the invention is that one of the valve bodies is assigned to the first outflow connection and the other of the valve bodies is assigned to the second outflow connection. Thus, the inflow connection is valve-free and the fluid running into the housing or into the valve device can penetrate the interior without hindrance. Depending on which sliding end position the valve is in, the fluid is then diverted from the housing by means of one outflow connection or by means of the other outflow connection.

The housing is especially preferably formed as a T-shape, wherein the inflow connection between, particularly in the middle between, the outflow connections exits into the housing. The inflow connection thereby exits directly into the clearance between the valves, and the fluid flowing is then directed into the one or the other direction as a function of the closed position of the valve.

The second spring element is preferably produced from a shape-memory alloy. This is how the second spring element obtains its thermal activation capacity. As soon as a predefinable limit temperature has been exceeded, the shape-memory spring element responds and expands such that its working force exceeds the spring force of the first spring element, such that the valve is moved against the force of the first spring element, into the second sliding end position. This ensures temperature-dependent switching of the valve device in a simple manner. If the temperature drops to below the limit or below a second limit, the second spring element can be again compressed by the first spring element and the valve can be moved into the first sliding end position.

The following is intended to provide more detail on the invention by means of the drawings. The following is shown:

DESCRIPTION OF EXAMPLE EMBODIMENTS

Figure 1:
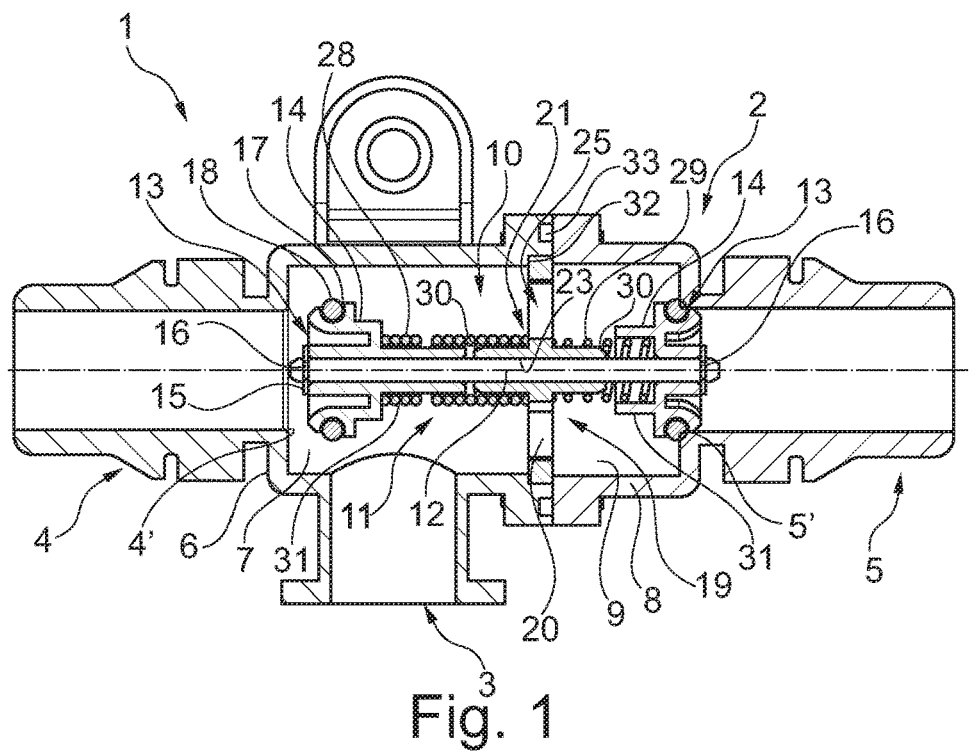
FIG. 1 shows a valve device in a simplified longitudinal section.

FIG. 1 shows, in a simplified longitudinal section, a valve device 1, which is formed as a thermal switchover valve for the water circuit of a motor vehicle. Due to the valve device, the fluid is conveyed either in a first or in a second circuit as a function of the temperature of the fluid conveyed by the valve device 1.

To this end, the valve device 1 has a multipart housing 2, which has an inflow connection 3, a first outflow connection 4, and a second outflow connection 5. The housing is formed in a T-shape, wherein the outflow connections, 4 and 5, are designed to be flush with one another on the housing 2, while the inflow connection 3 between outflow connections 4 and 5 exits into the housing 2 perpendicular thereto. According to the present exemplary embodiment, the housing 2 is formed in two parts, wherein a first housing part 6 is formed in the shape of a cup in order to form a chamber 7, into which connections 3 and 4 exit. Connections 3 and 4 are thus formed on the housing part 6. The chamber 7 is closed by a housing cover 8, which forms the second part of the housing 2, wherein the housing cover 8 is likewise formed in the shape of a cup, in order to form a chamber 9, which, in the mounted condition, jointly forms a valve chamber 10 of the valve device 1, together with the chamber 7. In addition, the second outflow connection 5, which is arranged or aligned to be flush or opposite the first outflow connection 4, is formed on the housing cover 8.

A valve 11, which is mounted so as to shift longitudinally or mounted so as to shift axially, is arranged in the valve chamber 10, said valve closing either outflow opening 4 or outflow opening 5, depending on which axial sliding end position the valve 11 is in.

The valve 11 has a cylindrical main part 12, the length of which corresponds to approximately the longitudinal extension of the valve chamber 10. The main part 12 here is somewhat longer such that it protrudes into connections 4 and 5 in certain areas, at least when it is in a sliding end position, which will be explained in more detail in the following.

A valve element 13 is arranged on the main part 12 on each end face. Each of the valve elements 13 has a valve body 14 arranged on the main part, said valve body being axially pushed onto the main part 12. A circlip 15 to axially lock the valve body 14 in the direction of the respective end of the main part 12 is assigned to each of the valve bodies 14. The circlip 15 is formed particularly as a tensioning ring and retained in a circumferential groove 16.

Each of the valve bodies 14 additionally has a ring groove 17 extending about its periphery, in which an elastically deformable sealing ring 18, particularly an O-ring, is arranged such that it can interact, in a sealing manner, with a respective valve seat 4', 5' of connection 4 or 5 assigned to the housing 2 in order to close said housing. The valve elements 13 in this case are arranged on the main part 12 such that the maximum distance with respect to each other is less than the distance between the valve seats 4' and 5' formed in the housing 2 and the outflow opening 4, 5 such that only one of the valve elements 13 can interact with one of the valve seats 4' or 5'. This ensures that at least one of the outflow connections, 4 or 5, is open independently of the sliding end position of the valve 11.

In addition, a linear bearing 19 is assigned to the main part 12, between the valve bodies 14. The linear bearing is formed by a bearing web 21 formed as a bearing ring 20, said bearing web extending radially from the housing 2 inward into the valve chamber 10.

Figure 2:
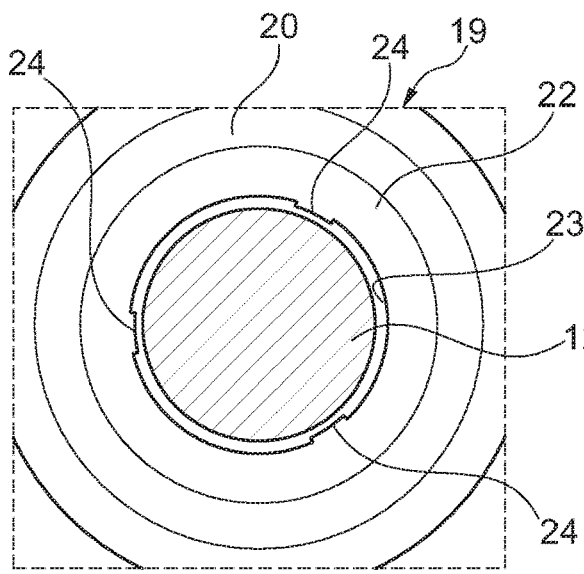
FIG. 2 shows a bearing ring in a perspective representation.

FIG. 2 shows the bearing ring 20 in a perspective representation. The bearing ring 20 has a bearing section 22 in the middle, which protrudes axially from the remaining bearing ring 20. The bearing section 22 is formed in a cylinder shape, wherein a continual bearing opening 23 is used to hold the main part 2 for longitudinal shifting. According to the present exemplary embodiment, the bearing opening 23 has an inner contour deviating from a circular shape.

Figure 3:
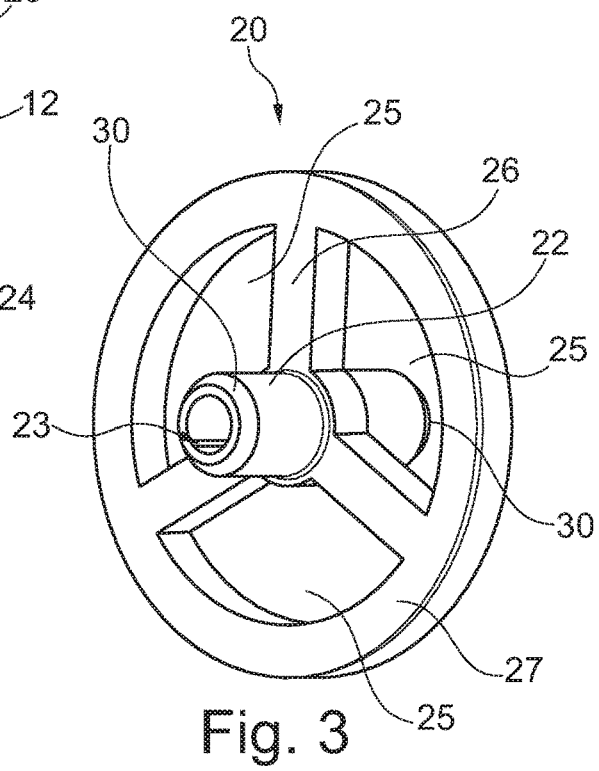
FIG. 3 shows the valve device in a detailed cross-section.

To this end, FIG. 3 shows a sectional view through the bearing 19 from FIG. 1, with the main part 12 lying in the bearing opening 23. The bearing opening 23 has three guide webs 24 about the periphery which are arranged equidistant to each other, and which protrude radially inward and are used for linear sliding guidance of the circular main part 12 in the cross-section. Due to the guide webs 24 or ribs, a gap remains between the guide webs 24, between the main part 12 and a bearing section 22, through which fluid can flow and particularly dirt particles can be flushed out of the bearing area. This prevents the main part 12 from being stopped up due to dirt in the fluid or cooling water in the bearing 19.

Particularly as shown in FIGS. 2 and 1, the bearing ring 20 further has multiple axial openings 25, which are formed some distance away from the bearing opening 23. Three such axial openings 25 are provided here, which are formed by three corresponding radial webs 26, which connect the bearing section 22 with a support ring 27 extending about the entire outer periphery.

As is further clear from FIG. 1, a first spring element 28, which is formed as a helical spring and is arranged coaxially with respect to the main part 12, is held axially pre-tensioned between one of the valve elements 13 and the bearing ring 20. The first spring element 28 in this case is assigned to the valve element 13, which is assigned to the first outflow connection 4.

A second spring element 29 is pre-tensioned between the bearing ring 20 and the other valve element 13, said spring element likewise being formed as a helical spring and being arranged coaxially with respect to the main part 12. Contrary to the first spring element 28, spring element 29, however, is produced from a shape-memory alloy and thus as a thermally activated actuator element. The spring element 29 thus has two different maximum spring forces as a function of its temperature. In low temperatures, the second spring element 29 has a first spring force, which is less than the spring force of spring element 28. The first spring element 28 thereby pushes the valve 11 with the one valve element 13 in the direction of the first outflow connection 14 such that the sealing ring 18 forms an annular seal with the housing 2 and/or valve seat 4' in a first sliding end position of the valve 11, said seal completely closing the outflow connection 4 such that no fluid can escape from the outflow connection 4. Instead, the outflow connection is open due to the shifting.

If the temperature of the second spring element 29 increases to beyond a limit, the shape-memory alloy is activated and the spring element 29 is impacted with an increased second spring force, which is selected such that it is greater than the spring force of the first spring element 28. Thus, the force ratio on the valve 11 reverses such that the second spring element 29 pushes the valve 11 into a second sliding end position and/or the valve element 13 assigned to it is pushed against the valve seat 5' of outflow connection 5 and thereby closes outflow connection 5, while outflow connection 4 is opened or enabled.

If the temperature of the second spring element 29 drops to below the first limit, or below a second limit, when the shape-memory alloy implements a switching hysteresis, the force ratios again reverse, and outflow connection 4 is closed and outflow connection 5 is opened.

This results in an advantageous valve device 1, which ensures simple switching as a function of the temperature of the fluid flowing into the housing 2 through the inflow connection 3. If the heat is sufficient for activating the shape-memory alloy of the spring element 29, the valve device 1 switches over such that the flow of fluid is routed through outflow connection 5. If the temperature of the fluid is not sufficient, the fluid is routed through outflow connection 4. This causes the fluid to automatically be supplied to different circuits as a function of its temperature. This has particular advantages when using the valve device in the thermal management of a motor vehicle.

Due to the advantageous design of the valve device 1, the valve 11 is additionally formed as a preassembled unit. For pre-assembly, the main part 12 is pushed axially into the bearing opening 23; subsequently, spring elements 28 and 29 are pushed onto the bearing section 22. In doing so, the bearing section 22 is formed such that the helical springs can each be pushed onto the bearing section 22. The bearing section 22 of the bearing ring 20 thus forms a guide for the helical springs 28, 29. Preferably, the bearing section has centering chamfers or lead-in chamfers 30 on its front sides for this, said chamfers facilitating the sliding on of the helical springs. The valve body 14 likewise has guide sections 31 for the helical springs. In this case, the outer diameter of the respective guide section 31 may be designed greater than or less than the inner diameter or the outer diameter of the respective helical spring such that the helical spring is either pushed on the valve body or into a valve body mount. FIG. 1 shows both embodiments, wherein the helical spring 28 is pushed onto the bearing section 31 of the valve body 14 to the left in the figure. The helical spring and/or the spring element 29, on the other hand, is inserted into an axial mount of the bearing section 31 of the valve body 14 to the right in the figure. In both cases, it is ensured that the helical springs are reliably held between the valve bodies 14 and the bearing ring 20. In particular, the helical springs are arranged on the valve in a captive manner.

After the spring elements 28, 29, the valve elements 13 are thus pushed onto the main body 12 axially from two sides such that the helical springs are pre-tensioned. Due to the attachment of the circlips 15, the valve elements 13 are axially secured on the main part 12 against the force of the spring elements 28, 29. This forms the finished preassembled unit.

In order to assemble the valve 11 in the housing 2, it is simply pushed axially, as the described preassembled unit, into the chamber 7 of the housing element 6. To this end, the housing 2 has a diameter increase on its side facing the housing cover 8, by means of which an axial stop 32 is formed, with it being possible to push the bearing ring 20 into the housing element 6 up to said stop. With the arrangement on the housing element 6, the housing cover 8 is formed such that it likewise axially impacts the bearing ring 20, in that its inner diameter is less than the outer diameter of the bearing ring 20, as shown in FIG. 1. Appropriately, the bearing ring 20 is radially pressed in the housing or at least essentially retained without play. Due to this, the bearing ring 20 and thus the entire valve 11 are securely retained and aligned in the valve chamber 10. Appropriately, an axial sealing ring 33, by means of which the valve chamber 10 is securely sealed off to the exterior, is arranged between housing parts 9 and 8.

Due to the simple assembly and the compact design of the valve device 1, it can be produced and mounted with less expense. Furthermore, only little installation space is required.

The invention claimed is:

1. A valve device for a cooling water system of a motor vehicle, comprising:

a housing, which has an inflow connection and a first outflow connection and a second outflow connection;

a valve, which is mounted in the housing so as to shift, wherein the valve has a cylindrical main part, at each end of which a valve element is arranged in order to close one of the connections in a first sliding end position of the valve and another of the connections in a second sliding end position of the valve;

a first spring element, which biases the valve in the direction of the first sliding end position; and a second spring element being a thermally activatable actuator element, which is designed to push the valve against a force of the first spring element in the direction of the second sliding end position upon being activated, wherein the first spring element and the second spring element are each axially tensioned between one of the valve elements and a bearing web protruding from the housing inward radially, wherein the first and second spring elements are each formed as a helical spring and are arranged coaxially with respect to the main part, wherein the bearing web is formed by a bearing ring inserted into the housing, the bearing ring having a bearing opening formed in a cylindrical and axially protruding bearing section thereof, the bearing opening being configured to slidably receive the main part, and wherein the bearing section is formed as a guide section for at least one of the first and second spring elements.

2. The valve device according to claim 1, wherein the bearing ring, together with the valve, is formed as a preassembled unit.

3. The valve device according to claim 1, wherein the bearing opening has at least two guide bars for the main part, which protrude radially inwards and are arranged apart from one another in a circumferential direction.

4. The valve device according to claim 1, wherein the bearing ring has at least one axial opening spaced apart from the bearing opening.

5. The valve device according to claim 1, wherein the bearing ring has a continuous support ring on its exterior periphery for mounting in the housing.

6. The valve device according to claim 1, wherein each valve element has a valve body arranged on the main part, the valve bodies each have an elastically deformable sealing element.

7. The valve device according to claim 6, wherein one of the valve bodies is assigned to the first outflow connection and the other of the valve bodies is assigned to the second outflow connection.

8. The valve device according to claim 1, wherein the housing is formed in a T-shape, wherein the inflow connection exists between the first and second outflow connections, and the inflow connection exits into the housing.

9. The valve device according to claim 1, wherein the second spring element is made from a shape-memory alloy.

10. The valve device according to claim 1, wherein the bearing ring and the protruding bearing section are formed integral as a single piece-part.

* * * * *